June 10, 1958     J. B. LE POOLE     2,838,665
GENERATOR PRODUCING PULSATORY VOLTAGES
Filed Sept. 1, 1954

INVENTOR
JAN BART LE POOLE

BY *Fred M. Vogel*
AGENT

United States Patent Office 2,838,665
Patented June 10, 1958

2,838,665
GENERATOR PRODUCING PULSATORY VOLTAGES

Jan Bart LePoole, Delft, Netherlands, assignor, by mesne assignments, to North American Philips Company, Inc., New York, N. Y., a corporation of Delaware Application September 1, 1954, Serial No. 453,511

Claims priority, application Netherlands September 15, 1953

4 Claims. (Cl. 250—27)

This invention relates to electric generators producing a voltage resulting from superposition of the voltage from a source of alternating current on the direct voltage obtained from said current source by rectification and capacitor charge. Said generators will hereinafter be termed generators for producing pulsatory voltage. The simplest circuit arrangement for such generators is the type which comprises the series-combination of the source of alternating current, one or more capacitors and one rectifier. (Figs. 10–12a on page 520 of "Radio Engineering," by F. E. Terman, third edition, published 1947, by McGraw-Hill of New York City.) The voltage made available across the terminals of said rectifier varies periodically approximately between zero and twice the maximum value of the alternating voltage. The average potential across the output terminals relative to that of the source of alternating current can be shifted by distributing the constant voltage component over two capacitors between which the rectifier is connected. Furthermore, the circuit arrangement may be extended by one or more stages each comprising a rectifier and one or more capacitors. The combinations thus obtained are cascade arrangements.

When using a generator for producing pulsatory voltage for supplying an electron-discharge tube it is sometimes desirable for the anode current of said tube to be suppressed during a part of the cycle. Thus, for example in X-ray apparatus, the current is sometimes limited to a part of the cycle in which the voltage exceeds the maximum value and during which it is substantially constant, with a view to improving the radiation spectrum and reducing the production of heat.

To this end there may be utilized an auxiliary electrode (grid) having a potential which is low so that the tube is only conductive if the voltage between the cathode and the anode exceeds a particular value.

One method of securing the desired negative grid voltage in a simple manner is to connect the grid and the cathode through an impedance, hereinafter termed control network, comprising a capacitor and a shunt resistor or a combination having a corresponding frequency characteristic. In order to distinguish from the capacitors intended for increasing the output voltage (booster capacitors) the capacitor of the control network will hereinafter be termed the control capacitor.

In the conventional arrangements, the control network is connected in series with a tube, so that the voltage drop driving the grid negative is caused by the tube current.

Upon the capacitor of the control network thus connected obtaining a given charge and the negative grid voltage consequently attaining a particular value, which depends upon the characteristic of the tube, the ratio between the maximum value and the mean value of the tube current increases materially.

The present invention concerns a generator for producing pulsatory voltage and comprising the aforesaid control network. In accordance with the invention, this network is not connected in series with the load but is provided in the charging circuit of the booster capacitor. In a circuit of the type described, one of the terminals of the source of alternating current may for this purpose be connected, whether or not through a booster capacitor, to the cathode of the load tube while the anode of the rectifier may be connected to the grid of the load. The advantage accruing from this modification may best be explained with reference to the accompanying drawing, given by way of example, in which:

In the drawing, corresponding parts are provided with the same reference numerals.

Figure 1:
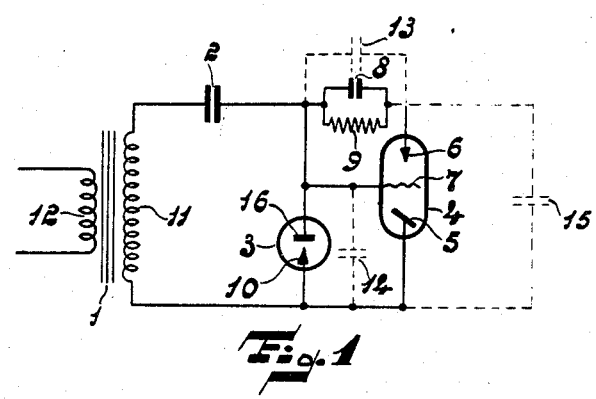
Fig. 1 is a schematic diagram of a generator circuit of the type described, in conventional combination with a load.
Figure 2:
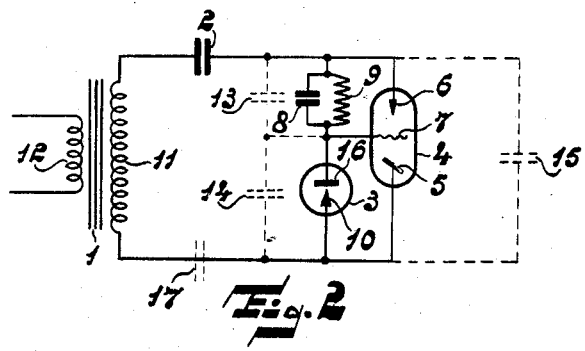
Fig. 2 is a schematic diagram of an embodiment of the generator circuit of the present invention.

The generator shown in Figures 1 and 2 comprises a transformer 1, a booster capacitor 2 and a rectifier 3. Connected to the generator is some electron-discharge tube 4, for example an X-ray tube or other discharge device, wherein an electron beam is produced such as, for example, an electron microscope or an electron diffraction apparatus.

The load 4 comprises an anode 5, a cathode 6 and a regulating electrode (grid) 7. The grid 7 is connected to the cathode through a control network comprising a control capacitor 8 and a shunt resistor 9. One end of the secondary winding 11 of the transformer 1 is connected to the anode 5 of the tube 4 and the cathode 10 of the rectifier 3. The other end of said winding is connected to one electrode of the booster capacitor 2, the other electrode of this capacitor being connected to the control network 8, 9.

The operating voltage is the sum of the alternating voltage of the winding 11 and the constant voltage of the booster capacitor 2 and varies by a difference in value of twice the maximum value of the secondary transformer voltage. The current passing through the tube 4 as a result of said voltage charges the control capacitor 8 connected as shown in Fig. 1, thus driving the grid 7 negative with respect to the cathode 6. By a suitable choice of the electrical values of the control network provision can be made for an appreciable current to pass through the tube each time in the desired phase and only during the desired period.

The grid may be connected capacitively by other means besides the capacitors mentioned. The incandescent cathode 6 is usually supplied from a filament current transformer (not shown) which is connected to the same A. C. supply as the primary winding 12 of the transformer 1. In this manner, and also from other causes, so-called parasitic capacities may materialize, which form part of an A. C. circuit and may thus produce alternating voltages.

In the drawing, one of said parasitic capacities is represented as a capacitor 13 between the cathode 6 and the grid 7. This capacitor is connected in parallel with the control capacitor and, although it might influence the capacity required for the capacitor 8, it is in itself unable to set up an alternating voltage at the grid. In the circuit arrangement shown in Fig. 1, a second parasitic capacitor, represented in the drawing as a capacitor 14 in parallel with the rectifier 3, does not affect the voltage between the grid and the cathode of the tube 4. However, the capacity between the cathode and the anode of tube 4 should be considered. In the circuit arrangement shown in Fig. 1, said capacity lies, relatively to the secondary voltage of the transformer 1, in series with the capacitors 2 and 8, hence it is able to produce an alternating voltage which is superposed on the voltage applied to the capacitor 8 through the tube current. This alternating voltage reduces the grid potential during the time period in which the tube current is required to be maximum and consequently, upon attaining an appreciable value, renders the valve action of the grid deficient if not impossible.

In accordance with the invention, the control capacitor 8 is not charged by the loading current, but by the charging current of the booster capacitor 2. This is secured by so altering the connections as to obtain the circuit arrangement shown in Fig. 2, wherein the booster capacitor 2 is connected to the control network not on the side of the grid but on the side of the cathode of the tube 4. In this case, said network is consequently connected between the booster capacitor 2 and the anode 16 of the rectifier 3 with the result that the parasitic capacity 15 loses its influence on the grid potential. However, the parasitic alternating current through the capacitor 14 then passes through the control network which, in turn, produces an alternating voltage on the grid. This alternating voltage, however, increases the grid potential during the time period in which the current through the tube 4 should be maximum, hence the parasitic alternating current then supports the desired action of the grid instead of counteracting it.

This improvement is not only obtained with a booster capacitor connected between the A. C. source and the cathode of the load, but also if another capacitor is connected between the A. C. source and the anode of the load and if, as a third alternative, the booster capacitor is not connected between the A. C. source and the cathode of the load, but between the A. C. source and the anode of the load. In Fig. 2, said capacitor is indicated in broken lines at 17.

Figure 3:
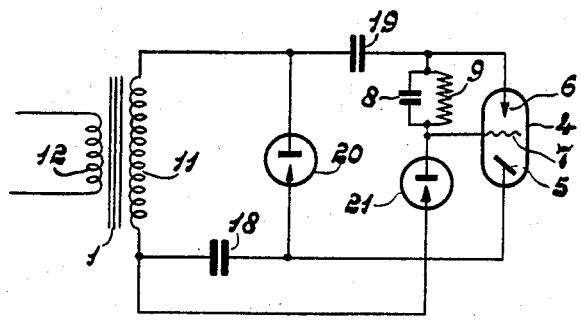
Fig. 3 is a schematic diagram of another embodiment of the generator circuit of the present invention.

Fig. 3 is a schematic diagram of another embodiment of the generator circuit of the present invention. It is a circuit of the type comprising two capacitors 18 and 19, and two rectifiers 20 and 21, which produces a pulsatory voltage varying approximately between the maximum value and three times the maximum value of the alternating current. In this case also, the invention may be used. The same control network 8, 9 as employed in the circuit of Fig. 2 is connected between the grid 7 and the cathode 6 of the tube 4 in Fig. 3, the booster capacitor 19 being connected to said network on the side of the cathode 6, so that the charging current of said capacitor and not the loading current of the generator passes through said network.

What is claimed is:

1. A pulse generator comprising a series combination of a source of alternating voltage and a capacitor, a load comprising an electron discharge tube having an anode, a cathode and a grid, a rectifier and a grid voltage control network connected in series across said series combination, means connecting said cathode to the junction of said network and said series combination, means connecting said anode to the junction of said rectifier and said series combination, and means connecting said grid to the junction of said network and said rectifier.

2. A pulse generator comprising a series combination of a source of alternating voltage and a capacitor, a load comprising an electron discharge tube having an anode, a cathode and a grid, a rectifier having an anode and a cathode and a grid voltage control network connected in series across said series combination, the anode of said rectifier being connected to said network, the cathode of said rectifier being connected to said series combination, means connecting the cathode of said tube to the junction of said network and said series combination, means connecting the anode of said tube to the junction of the cathode of said rectifier and said series combination, and means connecting the grid of said tube to the junction of said network and the anode of said rectifier.

3. A pulse generator comprising a series combination of a source of alternating voltage and two capacitors, one of said capacitors being connected to each terminal of said source, a load comprising an electron discharge tube having an anode, a cathode and a grid, a rectifier having an anode and a cathode and a grid voltage control network connected in series across said series combination, the anode of said rectifier being connected to said network, the cathode of said rectifier being connected to said series combination, means connecting the cathode of said tube to the junction of said network and said series combination, means connecting the anode of said tube to the junction of the cathode of said rectifier and said series combination and means connecting the grid of said tube to the junction of said network and the anode of said rectifier.

4. A pulse generator comprising a first series combination of a source of alternating voltage and a first capacitor, a second series combination of said source and a second capacitor, a load comprising an electron discharge tube having an anode, a cathode and a grid, a first rectifier connected in series across said first series combination, a second rectifier having an anode and a cathode and a grid voltage control network connected in series across said second series combination, the anode of said second rectifier being connected to said network, the cathode of said second rectifier being connected to said second series combination, means connecting the cathode of said tube to the junction of said network and said second series combination, means connecting the anode of said tube to the junction of the cathode of said second rectifier and said second series combination, and means connecting the grid of said tube to the junction of said network and the anode of said second rectifier.

References Cited in the file of this patent

UNITED STATES PATENTS 2,420,844    Slack _____ May 20, 1947

FOREIGN PATENTS 375,031    Great Britain _____ June 23, 1932
519,481    Great Britain _____ Mar. 28, 1940